J. W. LAMBERT.
CHAIN TREAD FOR TRACTORS.
APPLICATION FILED DEC. 23, 1918.
1,318,157.
Patented Oct. 7, 1919.
2 SHEETS—SHEET 1.
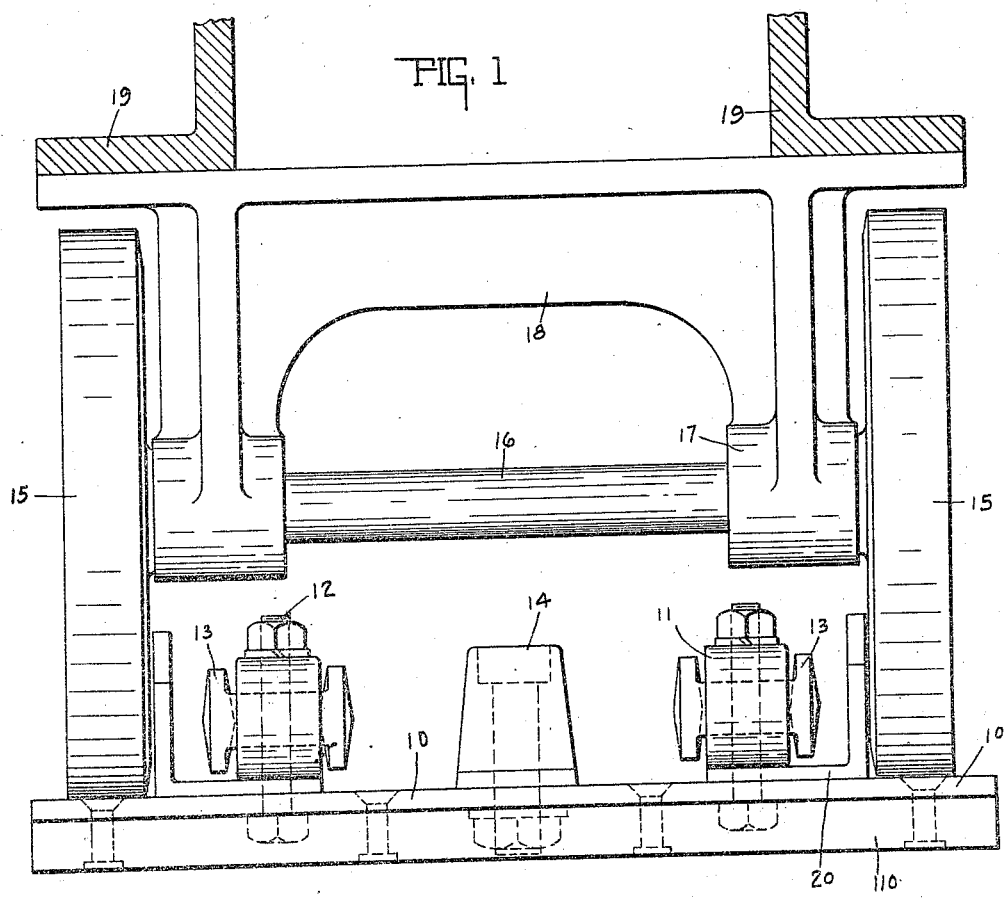
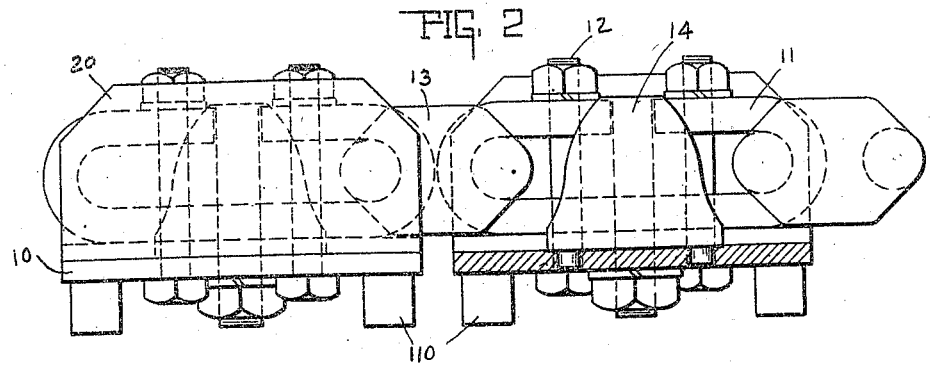
INVENTOR.
JOHN W. LAMBERT
BY
*Lockwood Lockwood*
ATTORNEY.

J. W. LAMBERT.
CHAIN TREAD FOR TRACTORS.
APPLICATION FILED DEC. 23, 1918.
1,318,157.
Patented Oct. 7, 1919.
2 SHEETS—SHEET 2.
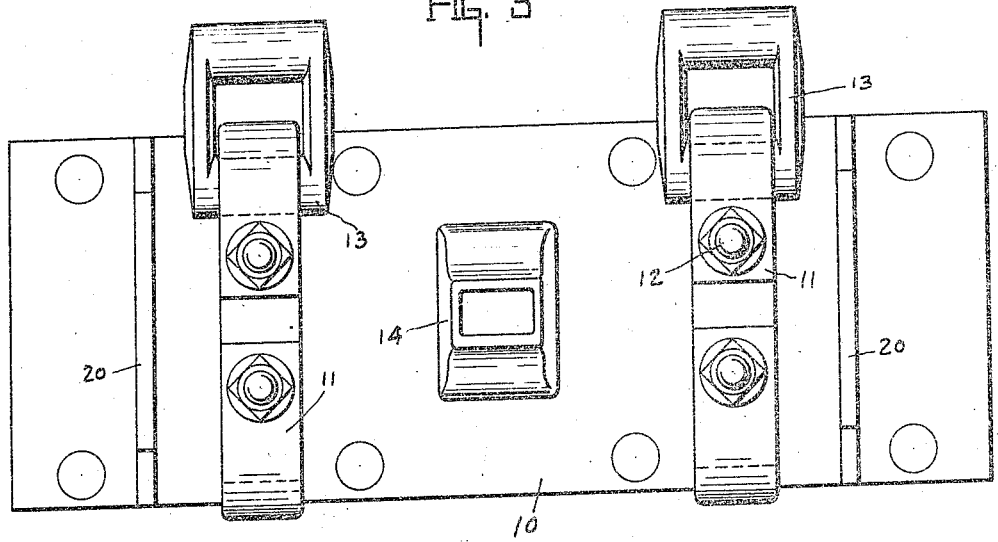
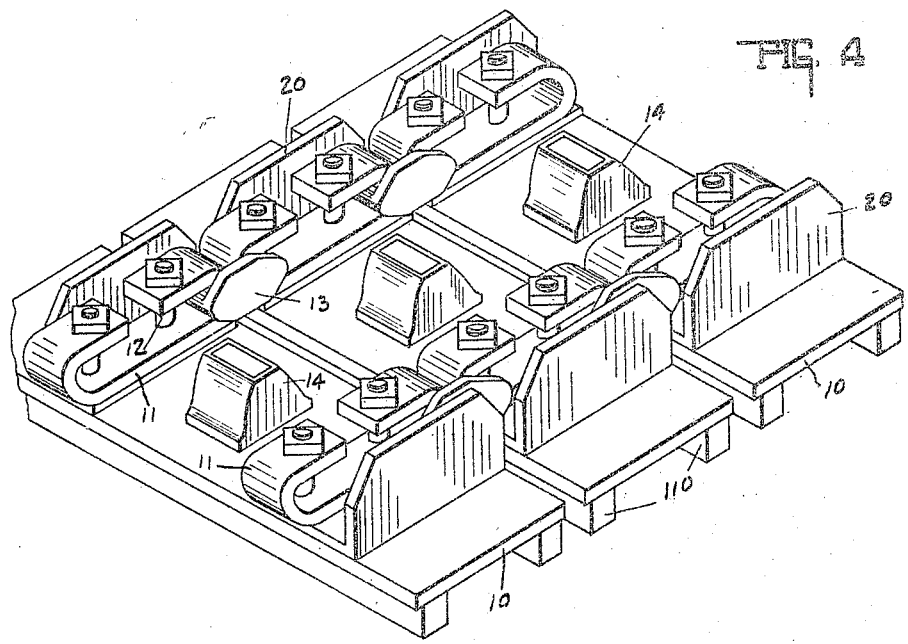
INVENTOR.
JOHN W. LAMBERT.
BY
Lockwood & Lockwood
ATTORNEY.

UNITED STATES PATENT OFFICE.

JOHN W. LAMBERT, OF ANDERSON, INDIANA.

CHAIN-TREAD FOR TRACTORS.

1,318,157.    Specification of Letters Patent.    Patented Oct. 7, 1919.

Application filed December 23, 1918. Serial No. 268,091.

*To all whom it may concern:*

Be it known that I, JOHN W. LAMBERT, a citizen of the United States, and a resident of Anderson, county of Madison, and State of Indiana, have invented a certain new and useful Chain-Tread for Tractors; and I do hereby declare that the following is a full, clear, and exact description thereof, reference being had to the accompanying drawings, in which like reference characters refer to like parts.

This invention relates to an improvement on chain treads for tractors intended to coöperate with pairs of guide wheels or trolleys which travel or ride upon the chain tread in pairs, one trolley or wheel near each lateral edge of the chain tread.

The object of this invention is to keep the chain tread in its proper position on steep hillsides and prevent the trolley wheel from slipping laterally off the chain tread, and also to protect the projecting ends of the coupling links uniting the members of the chain tread from wear or destruction of the lateral surfaces of the guide wheels or trolleys.

The chief feature of the invention consists in securing on the chain tread a series or row of vertically extending plates near each side thereof and spaced away from the edge of the chain tread far enough to permit the guide wheel or trolley to travel upon the chain tread between said guide plates and the edge of the chain tread.

The full nature of this invention will be understood from the following description and claims, together with the accompanying drawings.

In the drawings Figure 1 is a front elevation of a section of the chain tread and pair of said guide wheels and the means for mounting the same, portions of the frame being shown in vertical cross section. Fig. 2 is a side elevation of two sections of the chain tread, parts being broken away and one portion being shown in vertical, longitudinal section. Fig. 3 is a plan view of one section of the chain tread. Fig. 4 is a perspective view of three sections of the chain tread.

The chain tread consists of a number of plates or sections 10, widthwise of the chain tread and having on the underside transverse cleats 110 and on the upper side near each end a pair of links 11, secured by bolts 12, and the different sections are united together by intermediate links 13, which engage the adjacent ends of the links 11. At the middle of each section or plate 10 there is an upwardly extending tooth 14 in position to engage the teeth of the driving wheel, which is not here shown.

Upon said tread guide wheels 15 are adapted to ride or travel as the chain tread travels, and hold the chain tread down upon the ground. These guide wheels are arranged in pairs upon axles 16 mounted in bearing 17 on frames 18 secured to the bars 19 forming a part of the main frame of the tractor. The guide wheels 15 are spaced from each other so that they will ride upon the chain tread near the lateral edges thereof and thus distribute the bearing of them upon the chain tread.

In operation of such tractors it has been found that in traveling on a steep hill-side the guide wheels are liable to run off the chain tread and also at all times the inner surfaces of the guide wheels are liable to engage the inner ends of the links 13, and wear or injure them. To avoid these difficulties guide plates 20 are formed and secured to the chain tread substantially as shown. These are angle plates with a vertical portion extending parallel with the side of the guide wheel 15 and with a horizontal portion lying upon the section or plate 10 of the chain tread and beneath the link 11, and it is secured in place by the bolts 12, which extend through the links 11, guide plate 20 and the section plate 10 of the chain tread. Since there are two bolts 12 they would hold the guide plates 20 rigidly in position.

These guide plates 20 when thus secured form two rows on the chain tread, one near each side edge and spaced from the side edge of the chain tread far enough to furnish a channel or path for the travel of the guide wheel 15. That enables each pair of guide wheels 15 to operate in the position and manner illustrated in Fig. 1, and thus accurately guide the travel of the chain tread and prevent its lateral movement and effectively protect the links 13 from the wheels 15.

The invention claimed is:

1. The combination of transversely extending sections of a chain tread for tractors, means linking said sections to each other, and a guide plate on each section between each end thereof and the linking means so as to protect said linking means, and the guide plates being in alinement with each other to form a guide way and in position on the chain tread to leave a track for the wheels of the tractor between the plates and lateral edge of the chain tread.

2. The combination of transversely extending sections of a chain tread for tractors having a track for the wheels of the tractor near the edges of the chain tread, means for linking said sections to each other, and a guide plate on each section between the track and the linking means to protect said linking means and form a guide for the tractor wheels.

3. The combination of transverse sections of a chain tread for tractors, a link on each section near each end thereof, bolts for securing each link to each section, a link connecting adjacent ends of the corresponding links on adjacent sections, guide plates made in angular form with one portion secured by the bolts between each section and each link thereon and having a portion extending at a right angle from said section and arranged so that the extended portions of the guide plates will be in longitudinal alinement with each other and in position on the chain tread to leave a track for the wheels of the tractor between the plates and lateral edge of the chain tread.

4. The combination of a chain tread for tractors having wheels adapted to track on said chain tread near the two lateral edges thereof, a series of guide plates secured to the sections of the chain tread just inside of each wheel track extending at right angles from said plates and in longitudinal alinement with each other, and means between the two series of guide plates for linking the sections of the chain tread together, whereby the guide plates will guide the wheels and protect the linking means from the wheels.

In witness whereof I have hereunto affixed my signature.

JOHN W. LAMBERT.